United States Patent
Kuehl

(10) Patent No.: US 9,130,902 B2
(45) Date of Patent: *Sep. 8, 2015

(54) AUTOMATED HYBRID CONNECTIONS BETWEEN MULTIPLE ENVIRONMENTS IN A DATA CENTER

(71) Applicant: Rackspace US, Inc., San Antonio, TX (US)

(72) Inventor: Christopher Kuehl, Austin, TX (US)

(73) Assignee: Rackspace US, Inc., San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/456,406

(22) Filed: Aug. 11, 2014

(65) Prior Publication Data

US 2014/0351919 A1 Nov. 27, 2014

Related U.S. Application Data

(62) Division of application No. 13/036,219, filed on Feb. 28, 2011, now Pat. No. 8,832,818.

(51) Int. Cl.
*G06F 21/00* (2013.01)
*H04L 29/06* (2006.01)
*H04L 12/803* (2013.01)
*H04L 29/08* (2006.01)

(52) U.S. Cl.
CPC .......... *H04L 63/0218* (2013.01); *H04L 47/125* (2013.01); *H04L 63/02* (2013.01); *H04L 63/0209* (2013.01); *H04L 63/0263* (2013.01); *H04L 63/102* (2013.01); *H04L 67/10* (2013.01)

(58) Field of Classification Search
CPC ... H04L 63/02; H04L 63/0209; H04L 63/029; G06F 15/161
USPC ............... 726/11–15; 709/223–226, 238, 249
See application file for complete search history.

(56) References Cited

U.S. PATENT DOCUMENTS

| | | | |
|---|---|---|---|
| 8,417,938 B1 | 4/2013 | Considine et al. |
| 2009/0113051 A1 | 4/2009 | Franklin |
| 2010/0107162 A1 | 4/2010 | Edwards et al. |
| 2011/0231670 A1 | 9/2011 | Shevchenko et al. |
| 2012/0110275 A1 | 5/2012 | Ganti et al. |
| 2012/0147894 A1 | 6/2012 | Mulligan et al. |

*Primary Examiner* — Amir Mermanesh
(74) *Attorney, Agent, or Firm* — Trop, Pruner & Hu, P.C.

(57) ABSTRACT

A multi-tenant data center environment includes a dedicated domain having at least one dedicated server associated with a client and a cloud domain having at least one cloud server associated with the client. The cloud server may have a public interface to a public network and a private interface to a private network. In turn, a network device is coupled between the dedicated domain and the public network, and is further coupled to the cloud server via the private network. A controller of the data center may be used to determine presence of the cloud server, and configure the network device to allow certain traffic to pass directly to the dedicated domain, while preventing other traffic from this direct path, based on access controls of the network device.

16 Claims, 3 Drawing Sheets

AUTOMATED HYBRID CONNECTIONS BETWEEN MULTIPLE ENVIRONMENTS IN A DATA CENTER

This application is a divisional of U.S. patent application Ser. No. 13/036,219, filed Feb. 28, 2011, the content of which is hereby incorporated by reference.

BACKGROUND

With the ever increasing prevalence of computing devices and their use by individuals and businesses, the amount of information and processing needs continue to expand. Further, given the increasing use of web-based applications in all phases of commerce, increasing services are provided by data centers.

Many data centers are implemented by single businesses for their own use. However, another model has developed, where a managed hosting corporation provides computing capacity to customers via various computing resources present in a multi-tenant data center. Traditionally, such multi-tenant data centers provided for dedicated computing devices for each customer. According to this model, security concerns are kept to a minimum, as each customer's domain is separate and distinct from all other customers. However, there are drawbacks to this dedicated computing approach. Most particularly, to have enough computing support available when demand requires it, customers can be forced to purchase greater dedicated computing resources than they may otherwise need.

As result of this and other computing trends, the availability of so-called cloud computing has emerged. In general, cloud computing can be thought of as the providing of computing resources to an end user via the Internet, where the end user generally does not have dedicated access to the underlying physical computing devices. All manners of users have adopted the cloud computing model and accordingly many data centers including multi-tenant data centers have begun providing for cloud computing resources. Typically, the cloud computing resources are kept separate and independent from dedicated computing resources within a data center.

Thus although a customer of the data center can obtain additional computing resources as needed via the cloud computing domain, generally the customer is not able to directly connect its dedicated resources and cloud resources. As a result, communications between these different domains, even when between resources of a common customer, traverse a public network. Accordingly, a truly private environment between these disparate resources is not possible. Further, latency issues may arise in these communications.

Further still, such communications are generally billed to a customer as if the communications were between the customer and a non-affiliated entity. Thus by connecting computing devices of different security domains over a public network (such as the Internet), certain issues can arise such as a bandwidth billing challenge, in which communications over the public network are charged on either side, such that a single communication could be paid for multiple times. For example in some data centers, both outbound and inbound traffic on the public interface could be billed on the cloud side, and outbound traffic on the dedicated side may also be billed. Thus a multi-billing situation can occur for communications between resources of a single customer.

SUMMARY OF THE INVENTION

According to one aspect, the present invention is directed to a system for a data center environment, and more particularly for a multi-tenant data center environment. The system may include a dedicated domain of the multi-tenant environment including at least one dedicated server associated with a client, and a cloud domain of the multi-tenant environment that includes at least one cloud server associated with the client. This cloud server may have a public interface to a public network and a private interface to a private network. In turn, a network device is coupled between the dedicated domain and the public network, and is further coupled to the cloud server via the private network. To enable private communications between these disparate domains, a hybrid controller of the data center may determine presence of the cloud server, disable traffic from the cloud server to the public network, and instead route the traffic to the network device. Further, the hybrid controller may configure the network device to allow certain traffic to pass directly to the dedicated domain, while preventing other traffic from this direct path, based on access controls set up in the network device.

Another aspect of the present invention is directed to a method that includes connecting a private interface of a cloud server of a cloud environment of a data center to a port of a network device of a dedicated environment of the data center via a private network of the cloud environment. Further a record can be created for the cloud server in a hybrid controller of the data center, where the record includes an identifier of the cloud server and an IP address of the cloud server. Then an entry can be written in the network device that will allow communications from the cloud server destined for a dedicated server of the dedicated environment to be routed directly from the network device to the dedicated server, without traversing any portion of a public network of the data center. The hybrid controller may further enable polling the cloud environment for added or removed cloud servers at a given interval and update any associated records based on the polling.

Yet another aspect of the present invention is directed to a non-transitory computer-readable storage medium including instructions. Such instructions may cause a system to handle hybrid connections in a data center environment. In an embodiment, these instructions may cause an update to configuration information of a cloud server associated with a data center customer and coupled to a network device of the customer via a private network to identify such network device as a default gateway for outbound traffic from the cloud server. In addition the instructions may enable creation of a record for the cloud server in a control system of the data center, where the record includes a metadata key and a metadata value. Finally, the instructions may enable an entry to be written in the network device that includes the metadata key and the metadata value. Then based on this entry, the network device may permit outbound traffic from the cloud server directed to a dedicated server of the customer to be routed directly to the server through the network device.

DETAILED DESCRIPTION

In various embodiments, computing devices such as servers of different security domains may be connected together.

In this way, where these servers are within a single data center, communications can occur between the devices securely, with low latency and without incurring billing associated with information that traverses a public network interface of the data center. Thus in various embodiments, a hybrid connected solution provides network connectivity between dedicated environments and cloud environments deployed in the same physical data center. Using techniques in accordance with an embodiment of the present invention, access control can be automatically added and removed from a customer's network device in the dedicated environment as cloud computing devices are added and removed from a corresponding cloud account(s).

In many implementations a data center customer may be provided with servers associated with different compute domains, namely a dedicated compute domain and a cloud compute domain. The servers or other devices of the dedicated compute domain may be associated with a given client or customer of the data center. In turn, the cloud servers or other cloud devices that are to be connected into this dedicated compute domain may also be associated with the customer. Understand that as used herein, the term "cloud server" is directed to a virtualized instance of a server that can be associated (at least temporarily) with a given customer. In many situations, a single physical server such as a rack-mounted server may include many virtual server instances (that is, many cloud servers), where at least some of these different server instances can be associated with different customers. In other words, cloud servers can be virtualized instances running on shared hardware, e.g., one or more physical servers or racks of physical servers that run virtual instances for multiple customers. Furthermore, understand that the cloud servers can be routinely provisioned for a given customer and similarly can be routinely de-commissioned. Such commissioning and de-commissioning can occur with relatively high frequency, e.g., such servers can be activated for a given customer for certain hours of a day, for certain peak bandwidth times or so forth. Accordingly, embodiments may automatically detect the incorporation of a cloud server for a customer and automatically configure that cloud server for a hybrid connection in accordance with an embodiment of the present invention.

Figure 1:
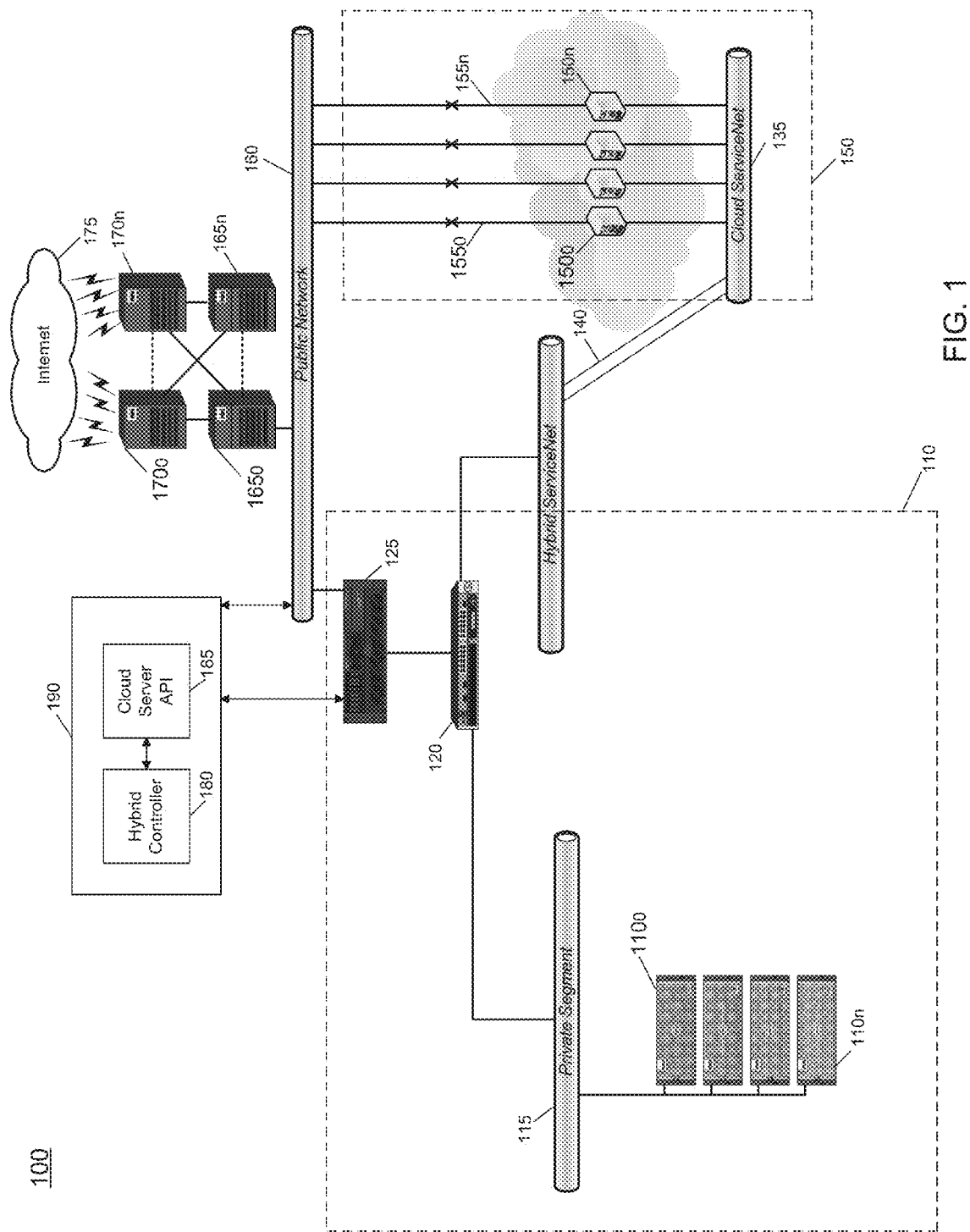
FIG. 1 is a block diagram of a hybrid connection system implemented within a data center in accordance with an embodiment of the present invention.

Referring now to FIG. 1, shown is a block diagram of a hybrid connection system implemented within a data center in accordance with an embodiment of the present invention. As shown in FIG. 1, system 100 may represent at least a portion of a data center. More specifically, system 100 may be at least part of a data center that is located in a common facility. The data center may be a single tenant environment or more typically, may be a multi-tenant environment. That is, the data center may house servers and other computing devices associated with multiple customers of the data center.

To that end, the data center may include multiple domains including a managed hosting environment 110, a cloud environment 150, and a trusted services environment 190. In the managed hosted environment, a plurality of dedicated servers $110_0$-$110_n$ associated with a first customer of the data center may be present. As dedicated servers, these servers may be provided to perform workloads, house information, perform web serving and so forth for a single customer to which the servers are dedicated. These dedicated servers are thus physical machines and can be implemented as rack-mounted servers, as an example. Note that in some implementations it is possible for the dedicated servers to run a private cloud, e.g., a virtualized infrastructure specifically dedicated to a single customer. Such virtualized cloud instances may be referred to as so-called "private cloud servers," as they are run on a dedicated physical machine of a single client.

To enable communications with other systems both present within the data center as well as via a public network, the dedicated servers may couple via a private interface 115 that in turn is coupled to one or more network devices. These network devices may also be associated with the dedicated customer. While the scope of the present invention is not limited in this regard, in various embodiments network devices may take the form of firewalls, load balancers, switches, routers or so forth. In the implementation shown in FIG. 1, private interface 115 is coupled to a load balancer 120 that in turn is coupled to a firewall 125. For example, in one embodiment the firewall may be a Cisco™ ASA firewall, while the load balancer may be an F5™ Big-IP load balancer. Although the network devices may take these commercially available forms in one embodiment, understand the scope of the present invention is not limited in this regard. As further seen, firewall 125 may in turn be coupled to a public network 160 so that communications from external entities can be communicated to the dedicated servers and vice versa.

Of course, while only shown with dedicated servers of a single customer, understand that a managed hosting environment of a given data center may include many different sets of dedicated servers and other computing devices, each associated with a different customer of the data center. Further, while shown with only a single pair of network devices, a customer can have multiple network devices, with different sets or subsets of dedicated computing devices associated with each such device.

As described above, while providing dedicated equipment for customers is a common arrangement in a data center, it is also possible to provide for non-dedicated computing resources to be shared by multiple customers. This can aid customers in handling computing tasks when extra bandwidth is needed, while avoiding the hardware and implementation costs for purchasing additional dedicated equipment that a customer may not fully utilize.

Accordingly, data center 100 may include a non-dedicated domain, also referred to as a cloud domain or environment 150 that can include, for example, a plurality of physical host servers $150_0$-$150_n$. Each of these physical servers may include multiple instantiations of cloud servers, each of which can be associated with a given customer. Accordingly, each physical server $150_x$ may include multiple virtual instantiated cloud servers that each can be associated with a given client. The various operations to be performed by these cloud servers can be similar to those discussed above with regard to the dedicated servers. However, in many implementations these servers may execute specialized functions such as web serving in times of increased demand for a client's website, back office processing during non-peak times or so forth. To provide interconnection with other systems, each server may include a public interface that has a publicly accessible or routable static IP address and a private interface that has an internal IP address. Thus each cloud server may include multiple interfaces, namely a public interface to a public network and a private interface to a private network. As with the dedicated servers, the cloud servers can communicate with entities outside the data center via a public network 160 via its public interface.

Of course, communications with dedicated servers of the same customer within the same data center may also be implemented in this way. However, as discussed above in many data center arrangements, the customer would be billed on a per communication basis for these communications that traverse the public network. Accordingly, in various embodiments the hybrid connection model described herein may be implemented and used to enable cloud servers 150 to communicate with dedicated servers 110 of the same customer without the need for traversing the public network, thus avoiding billing cycles and providing low latency and isolated network connectivity.

More specifically as further seen in FIG. 1, in accordance with an embodiment of the present invention, a hybrid connection may also be provided within the data center such that one or more cloud servers 150 may communicate directly with the dedicated equipment of a given customer, without access via a public network. To provide for this hybrid connection within the data center, a private network of the cloud domain, namely private network 135 may couple to one or more network devices of a dedicated domain. Note that the private network on the cloud side is an unmetered free network and any customer that has a cloud device on this network can communicate with any other device on that network. Note that although the communications are not via the Internet, this interface is not isolated to a single customer.

More specifically, as shown in FIG. 1 private network 135 may couple via a physical interconnect 140 directly to load balancer 120. In this way, communications between one or more cloud servers 150 associated with a customer can occur directly via load balancer 120 to one or more dedicated servers 110 associated with that same customer. In this way, billing for communications traversing the public network of the data center can be avoided.

To improve security in this hybrid connection scheme, all communications from and to a cloud server 150 associated with the customer may be routed through load balancer 120. Accordingly, a physical interconnect 155 that couples the corresponding cloud server to public network 160 may be disabled, as described further below. Although shown as being connected to load balancer 120, understand that the hybrid connection may be at any network device of the system associated with the customer, including firewall 125 or any other associated network device.

As further seen in FIG. 1, using public network 160 data center 100 may provide for communications via the Internet 175 through various layers of routers such as a one or more routing layer routers 170 and one or more aggregate switching layer routers 165.

To implement a hybrid interconnection scheme in accordance with an embodiment of the present invention, various mechanisms of the data center itself may be involved. As shown in FIG. 1, data center 100 may include a trusted environment 190, which may correspond to hardware and software of the data center entity itself. In one embodiment, trusted environment 190 may include a hybrid controller 180 which may be one or more servers or other computing devices or logic, hardware, software, or firmware executed on such devices of the data center that are used to configure hybrid connections between cloud servers and dedicated servers of a given customer. For example, hybrid controller 180 may store customer and network device details, IP assignments, cloud server data and so forth. Furthermore, a cloud server application programming interface (API) 185, which may execute on a given server of the trusted environment, may also be present and may be used to identify when new cloud servers are provisioned and/or decommissioned for a given customer and to enable hybrid controller 180 to perform various automated operations to configure hybrid connections as appropriate for a current state of one or more cloud servers. The cloud server API makes services available to cloud customers and may do everything from obtaining a list of servers, creating servers, deleting servers, adding IP addresses and so forth. Based on a list of a customer's cloud servers and private IPs and the information captured by the cloud server API, along with defined network rules, hybrid controller 180 may generate packet filters or access controls for a given network device and write the information to the network device (or updates in case of changes), and in addition create a notification (for example, an e-mail or ticket) to provide to the customer to document changes.

In one embodiment, hybrid controller 180 may include tables to store an identification of cloud accounts, which may include an account number, user name, API key and metadata such as a number of active cloud servers, and so forth, a table to store information regarding cloud servers including associated account, API server identifier, server name, private IP address, status and other metadata such as timestamps for instantiations and last snapshot, a table for network devices and so forth. In general, the information stored falls under the objects Customer Account (containing a relationship with one or more dedicated network devices), Network Device (containing access information for the Network Device and a relationship with one or more Cloud Accounts), Cloud Accounts (containing access information for the Cloud Account (username, API key, account number) and a relationship with one or more Network Rules), and Network Rules (defining the specific ports, protocols, and destination networks that traffic is able to reach from the cloud environment to the dedicated environment.) From a list of cloud servers that a customer has at a point in time and the customer's network rules, the hybrid controller can generate a set of configuration information to configure the network device. After this initial configuration, the hybrid controller may periodically access the current configuration information of the network device and determine if there are any differences to the current instantiations of cloud servers. If so, it will make those changes on the device. In addition, the hybrid controller creates a ticket in an internal ticketing system for the customer for each configuration and/or update so the customer can track the operations.

As will be discussed further below, as part of the configuration of the network device, by default all traffic coming from the cloud environment may be blocked from being passed to dedicated servers. In one embodiment a rule may be provided on the network device to restrict traffic from the entire cloud to the dedicated domain, with specific access allowed for cloud devices associated with the customer of the dedicated compute domain. Thus in general, the network device blocks all cloud traffic and then provides specific allowances for a given customer's cloud servers to communicate to the dedicated devices. As an example, entries may be generated and stored in a table of the network device that correspond to packet filters or access controls that allow communications from specified cloud servers (identified by source IP address) to be allowed to be routed directly to a dedicated server.

Due to the nature of cloud operations, the number of servers that the customer has changes all the time, and there may be different ways to add and remove servers. As examples, a customer can update cloud server instantiations through a control panel, e.g., accessed via a web browser, or an API client which makes API calls via an API server (e.g., cloud server API 185) to create and destroy cloud server instances. Thus the number of server devices is always changing: a customer may have two cloud servers and then 30 minutes later may have eight cloud servers and so forth. In addition IP addresses and other identifiers associated with the cloud instances can vary.

As a result, in one embodiment, the hybrid controller may be provided using a shared service application that at a predetermined interval, e.g., every few minutes, will query the cloud server API to request information including a list of the cloud servers for one or more customers, along with the private IP addresses, which the controller uses to write packet filters or access controls onto the network device to allow specific traffic to be directly routed to a destination dedicated server. As will be discussed further below, there can be various programming in terms of the types of access a customer can allow, e.g., which server they want to apply access to, type of communications or so forth.

Figure 2:
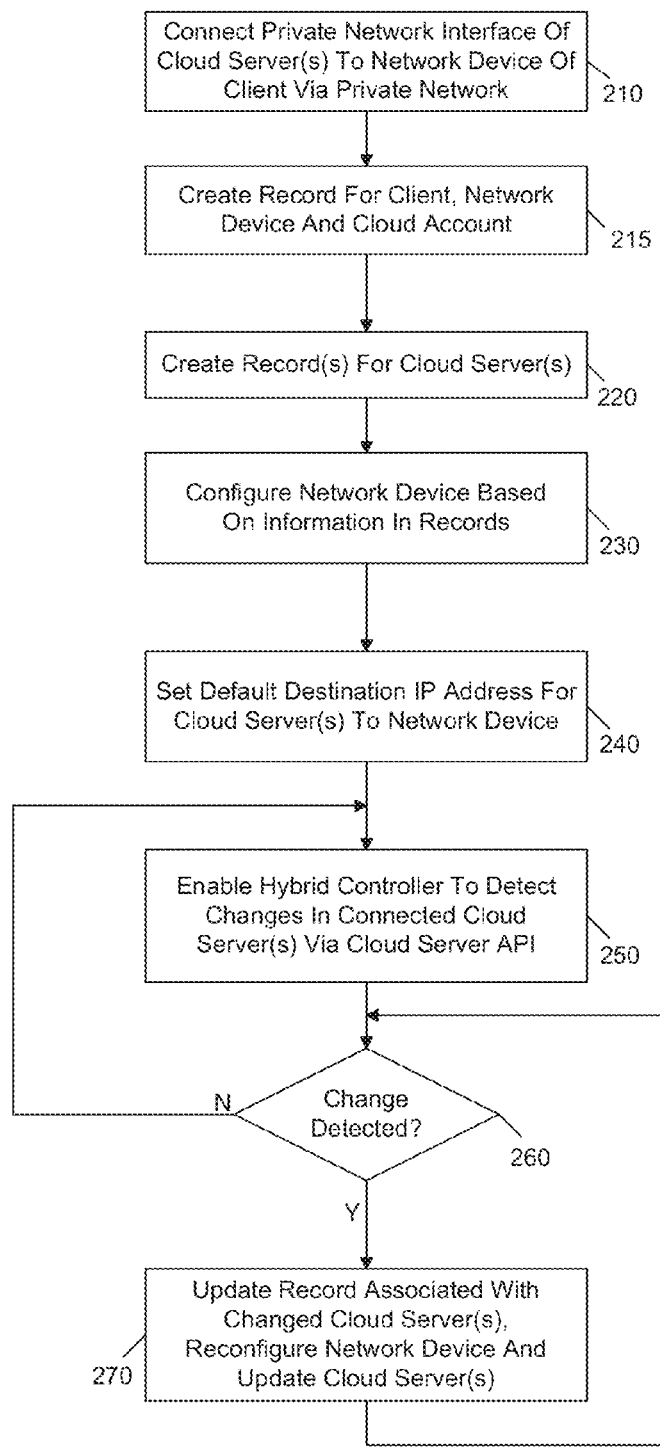
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to configure and initialize a hybrid connection in accordance with an embodiment of the present invention, as well as to perform updates to such connections during normal system operation. Note that the method of FIG. 2 assumes that a hybrid connection is available, meaning that a given customer of a data center has appropriate hardware available within the data center. That is, it is assumed that the network device of the client supports appropriate controls for hybrid connections by way of access controls, packet filters or other such routing mechanisms. Further, it is assumed that in addition to hardware of the dedicated environment, including one or more dedicated servers and a supported network device, the client also has a cloud account in the same data center, such that the client can instantiate one or more cloud servers for use in a hybrid connection environment.

As seen in FIG. 2, method 200 may begin at block 210 by connecting a private interface of one or more cloud servers to a network device of a client via a private network. That is, as discussed above with regard to FIG. 1, a physical connection may be provided between a private network of the cloud domain and a network device of a given client. Although this physical connection can be a direct interconnection, in many implementations due to space and wiring considerations of a data center, this physical connection may be by way of one or more switches in addition to various interconnects. After such physical connections are made, the method may continue to block 215, where various records may be created. Such records may be created for the client, network device and cloud account. Although shown at this stage of the process, understand that these records can be created at various time instances. These records may be used to obtain information when setting up particular cloud servers in a hybrid connection, as well as used for various other tasks within the data center. Also, while these records can be stored in various locations, in one embodiment the records can be stored in a storage associated with the hybrid controller so that the hybrid controller can access these records during configuration operations as well as normal data center operations.

Still referring to FIG. 2, control next passes to block 220, where a record may be created for one or more cloud servers that are instantiated and associated with the client. While details of various information that may be present in a record are discussed below, understand that at a high level, such records may include information regarding the cloud account, such as a user name identifier and an API key, access control information, metadata keys and values, and so forth. Still further, the records may further include information regarding the dedicated environment of the client, including identification of its network device, dedicated servers including identification information, IP addresses and so forth.

Then based on all this information, a network device associated with the customer may be configured (block 230). For example, in one embodiment various network rules such as packet filters, access controls or so forth may be written. In general, such rules may restrict traffic from the cloud environment directly to the dedicated environment via the network device (but which allows traffic not directed to systems of the client to be passed to the intended destinations via the network device and the public network). That is, rules may be in place to allow traffic originating from a customer's cloud servers to be routed to the Internet, but if the source IP is unknown (e.g., another customer's cloud server) then the traffic will be dropped by the default deny rule on the network device. However, in addition to this basic rule one or more exceptions may be provided to allow for communications from the appropriate cloud servers to the dedicated servers of the customer.

More generally, a network rule may be written by the hybrid controller to an entry within the network device to enforce access permissions for traffic from a cloud server. In general, network rules define what access each cloud server of a given customer's cloud account can have to the dedicated environment. Rules can be as broad as "unrestricted access over all ports and protocols" or as specific as some of the examples below (e.g., specifying protocol, port, destination IP or network).

When specifying a network rule for access from a cloud server to a dedicated environment via a hybrid interconnect, one option is to include a string to be matched against the server name to determine if the rule applies, e.g., server name matching. A wildcard match may be performed on the specified name. For example, if the match text is set to "web", servers named "prodweb1", "web1", and "web" would all match the rule. Server name matching allows a customer to specify that certain rules apply only to cloud servers with a specific string in their name (e.g., web, app, db, etc.).

Sometimes, it may be desirable to not alter the actual name of a cloud server instance. If desired, customers can provide a matching criteria as metadata at instance creation rather than relying on the server name. In one embodiment, to override the server name for network rule name matching, the following identification information may be used by the hybrid controller: Metadata Key: HybridNameMatch; Metadata Value: (name to override specified instance name with when performing network rule name matching). In this case, specifying the match string via this alternate metadata key will override the server name when the hybrid controller runs network rule matching logic. By specifying this metadata key/value pair, the instance name will not be evaluated by the hybrid controller for network rule matching, but will have no other effects on the instance itself or the automation. Thus if the key is present in metadata, it overrides the logic which looks at the server name; otherwise, the server name is used to evaluate the match. For example, if a network rule is looking for "app", a server named "tester1" with a metadata key value/pair of "HybridNameMatch"/"applicationserver" would match the network rule. In various embodiments, network rules can be updated at anytime, and changes can be applied the next time the hybrid controller runs.

Other examples of network rules may include:
From: all cloud servers on cloud account; To: all dedicated servers in environment.
From: all cloud servers on cloud account; To: subnet 172.24.16.0/24 in dedicated environment.
From: all cloud servers on cloud account containing "app" in their name (e.g., prodapp1, app2, app, testapp, etc.); To: IP address 172.24.16.50 on TCP port 1433 in dedicated environment.

Security of the hybrid connection can be realized by ensuring that only a given customer's cloud servers can communicate to the dedicated environment of the customer. Accordingly, traffic to the dedicated environment from the cloud environment can be secured by the above process that first blocks all traffic from the cloud, and then explicitly allows communications from the cloud servers of the customer by way of packet filters or access controls based on the network rules. More specifically, to control access via a load balancer, packet filters can be used, while to control access via a firewall, access controls can be used. In general, these filters/controls are essentially a rule that either allows or denies access from a source location to a destination location. Regardless of the type of network device, the automation provided by the hybrid controller may write the network rule to an entry of the network device in the correct format for the given network device. Note that with regard to traffic to the cloud servers from other cloud server customers, it is assumed that a customer will provide a host-based firewall such as IPTables or so forth (e.g., via a software firewall), to protect its cloud servers from other cloud server customers. However in other embodiments, automated configuration of a firewall on the cloud servers may also occur to provide security.

Still referring to FIG. 2, to enable communication between one or more cloud servers of the cloud environment and one or more dedicated servers of the dedicated environment, control passes to block 240 where a default destination IP address may be set for the cloud servers. More specifically, the private interface of the cloud servers may be updated such that its default gateway is to the gateway IP address from the given subnet that is assigned to the corresponding network device such that the default destination IP address may be that of the network device of the client. Thus the default gateway on the private interface of the identified cloud server is changed to route all traffic instead across the dedicated network device for the customer rather than routing the traffic to the public network. Further, a public interface of the cloud servers may be disabled such that all traffic to and from the cloud server is routed via the network device of the client, rather than directly through a public network. These default settings may be performed manually by the client itself, e.g., via a web interface or in other embodiments these settings may be performed via an automation tool of the data center environment such as the hybrid controller or another tool.

For example, assume that a pre-hybrid connection cloud server has a private interface set with an IP: 10.177.98.210; subnet mask: 255.255.224.0; and default gateway: 10.177.96.1. After configuring in accordance with an embodiment of the present invention, and assuming that the IP address of the network device to which the cloud server is to be routed is 10.177.126.240, the post-configuration cloud server private interface may be set at IP: 10.177.98.210; subnet mask: 255.255.224.0; default gateway: 10.177.126.240 (thus, same IP address and subnet mask, and taking as the default gateway the IP address of the associated network device).

At this point, both cloud components and dedicated components have been appropriately configured to enable a hybrid connection and communication in accordance with an embodiment of the present invention. Accordingly at this time, network routing rules as set forth in the components may be used to properly route communications.

With reference still to FIG. 2, to provide for automated updates to the hybrid connections in the case of servers being added or removed, control next passes to block 250. More specifically at block 250 a task such as a job run by a scheduler on the hybrid controller can be enabled to detect changes in the connected cloud servers, e.g., by leveraging data stored in the hybrid controller's database along with the cloud servers API to determine if the appropriate configuration is in place on the customer's network device. That is, this API may be instructed to run at a predetermined frequency, e.g., every 5 minutes, to poll cloud servers present in the cloud environment. Thus, the cloud server API may regularly obtain a list of the servers that the customer has available and various status information.

Based on the results of such polling, control passes to diamond 260 where it may be determined whether any change has been detected with regard to the customer's cloud servers. If not, control passes back to block 250, discussed above, for the next periodic polling. If instead it is determined that a change has been detected, control passes to block 270, where the record for cloud server may be updated with new information. Further, the network device itself may be reconfigured, e.g., with new or updated access controls or so forth. Still further, new or removed cloud servers may be updated appropriately. For example, a new cloud server may have its default destination IP address set to the IP address of the network device and have its public interface disabled, while instead a retiring cloud server may have its connection to the network device disabled. Thus this decommissioned cloud server instantiation may be placed in an available usage pool for provisioning for the same client or a different client. Although shown with this particular implementation in the embodiment of FIG. 2, understand the scope of the present invention is not limited in this regard.

In addition to the metadata described above, in some embodiments, a hybrid controller can leverage several other optional metadata key/value pairs that can be specified during cloud server instance creation in managing hybrid connections. Load balancer pools can contain cloud servers, dedicated servers, or a combination of both. Such pools may be used by customers seeking to load balance traffic to cloud servers or a combination of cloud servers and dedicated servers, or customers with a load balancer and looking to expand their environment on the cloud. Adding cloud servers to a load balancer pool in the case of a web server pool that scales up and down can be performed using such information. Namely, a load balancer pool name can be specified that a server should be placed in upon creation. Upon instance removal, the server will automatically be removed from the load balancer pool. In one embodiment, the following identification information may be used to enable this automated load balancer pool allocation: Metadata Key: HybridLoadBalancerPool; Metadata Value: (exact name of load balancer pool to add server to).

Another example of metadata usage is in assigning a public IP 1:1 network address translation (NAT). For certain dynamic workloads (e.g., those requiring that servers be spun up and down periodically) there is a need to use a consistent inbound public IP address through a dedicated firewall. This can be accomplished by first configuring a block of IP addresses (sized based on the number of instances to be spun up and down concurrently). These IP addresses can be routed to the network device and also entered into the hybrid controller as allowed IPs for Auto NAT. Upon cloud server instance creation, an unused public IP can be specified. When the hybrid controller sees the instance for the first time (e.g., within five minutes of instance creation) a static NAT statement will be added to the network device. Upon instance deletion, the static NAT statement will be removed and the IP address will again become available for assignment to another instance. An automation change notification ticket may provide details regarding NAT entries as they are added and removed, along with a listing of IP address available for assignment at the given time. In one embodiment, the following identification information may be used by the hybrid controller for such operation: Metadata Key: HybridPublicIP; Metadata Value: (available Public IP address for Auto NAT pool).

Figure 3:
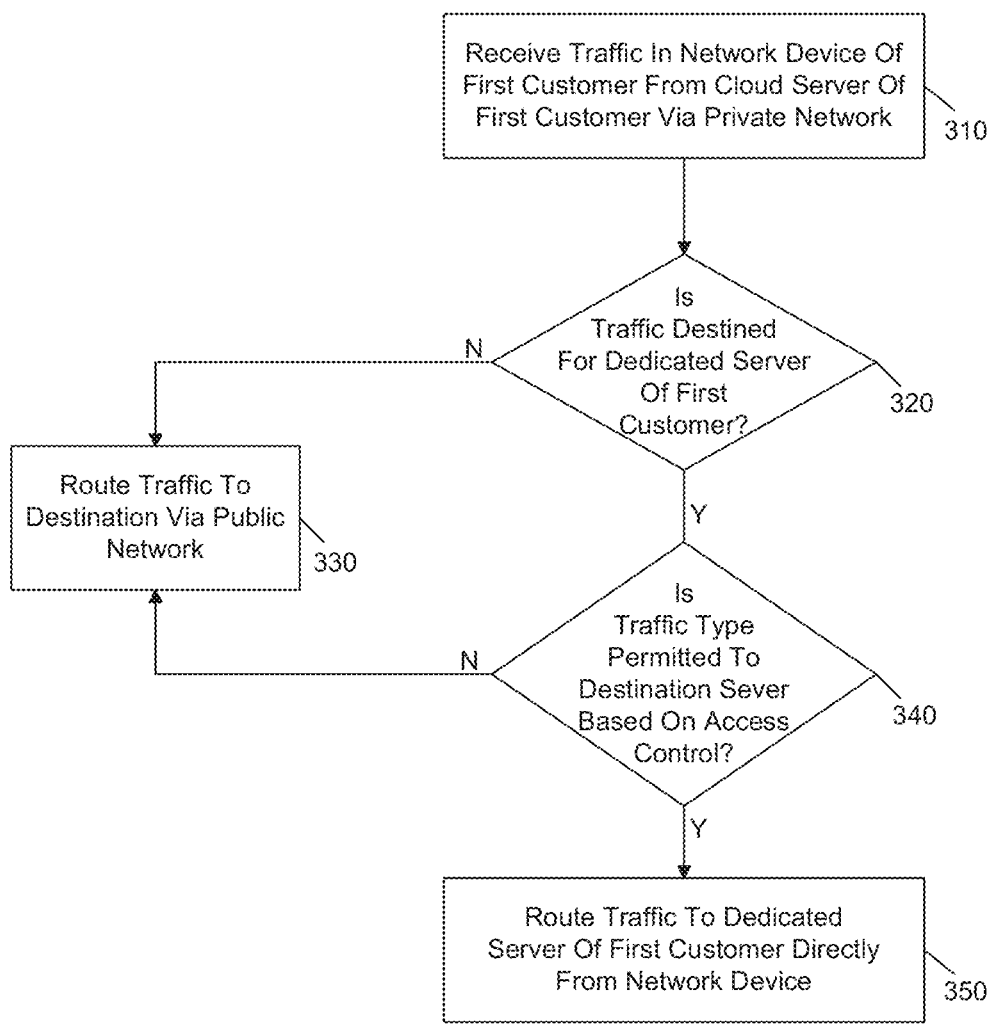
FIG. 3 is a flow diagram of a method for communicating data in accordance with an embodiment of the present invention.

Referring now to FIG. 3, shown is a flow diagram of a communication method in accordance with an embodiment of the present invention. As shown in FIG. 3, method 300 may be performed within a data center, and more specifically within one or more network devices of the data center that is associated with a customer that has implemented a hybrid connection as described above.

Method 300 may begin by receiving traffic in a network device of a first customer (block 310). More specifically, this traffic may be a communication from a cloud server that is associated with this first customer. Accordingly, this communication may be sent directly via a private interface of the cloud server and through a private network of the cloud server domain to the network device. Accordingly, a public interface of the cloud server (which has been disabled) does not send the communication across the public network.

Still referring to FIG. 3, control passes next to diamond 320 where it may be determined whether the traffic is destined for a dedicated server of the first customer. This determination may be made based on a destination IP address of the communication. If not, control passes to block 330 where the traffic may be routed to its destination via the public network. That is, because this communication is not intended for a dedicated server of the customer, instead the traffic may proceed to its destination via the public network.

If instead it is determined that the traffic is destined for a dedicated server of the customer, control passes from diamond 320 to diamond 340. There, it may be determined whether a traffic type of the communication is permitted based on the access controls set for the cloud server from which the communication is received. More specifically, a network rule may indicate that certain traffic types (e.g., traffic on specific ports or over specific protocols) are not to be directly routed to a customer's dedicated device. Accordingly, an access control record present in the network device for the cloud server may be set up such that this given type of communication is not to be permitted to directly proceed to the dedicated server(s) of the customer. Accordingly, control instead passes to block 330 where the traffic may be routed to its destination via the public network. Here, although the traffic may be intended to be destined to a dedicated server of the customer, it will be routed through the public network, according to the access controls.

Referring still to FIG. 3, if instead at diamond 340 it is determined that the traffic type is permitted to be provided directly, control passes to block 350. There the traffic may be routed to the dedicated server of the customer directly from the network device. Accordingly, this communication need not proceed whatsoever along the public network and thus there will be no billing consideration for this communication. Although shown with this particular implementation in the embodiment of FIG. 3, understand the scope of the present invention is not limited this regard.

Embodiments may be implemented in code and may be stored on a storage medium having stored thereon instructions which can be used to program a system to perform the instructions. The storage medium may include, but is not limited to, any type of non-transitory storage medium including optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a dedicated domain of a multi-tenant environment including at least one dedicated server associated with a client;
a cloud domain of the multi-tenant environment, the cloud domain including at least one cloud server associated with the client and having a public interface to a public network and a private interface to a private network;
a network device coupled between the dedicated domain and the public network, to create a hybrid connected network in which the at least one cloud server is coupled to the network device via the private interface of the at least one cloud server, the private network, and a physical interconnect, the private network to provide communications of cloud servers of multiple clients of the multi-tenant environment as an unmetered free network, the cloud domain and the dedicated domain co-located in the multi-tenant environment; and
a hybrid controller coupled to the network device to automatically determine presence of the at least one cloud server and to disable the public interface of the at least one cloud server to prevent traffic from the at least one cloud server to be sent to the public network and to route the traffic to the network device, wherein the private interface of the at least one cloud server is connected with a pre-hybrid connection IP address and subnet mask of the at least one cloud server and a pre-hybrid connection default gateway of the private interface is replaced with an IP address of the network device, to enable the traffic to be routed to the network device, wherein the hybrid controller is to write an entry in the network device associated with the at least one cloud server, wherein the entry is to allow communications from the at least one cloud server destined for the at least one dedicated server to be routed directly from the at least one cloud server via the private interface, the private network, and the physical interconnect to the network device and thereafter to the at least one dedicated server without traversing the public network, and wherein the system is to allow a first communication from the at least one cloud server to be provided directly from the network device to the at least one dedicated server based on the entry, wherein the first communication is destined to the at least one dedicated server.

2. The system of claim 1, wherein the network device comprises a firewall coupled to the public network.

3. The system of claim 2, wherein the network device further comprises a load balancer coupled to the firewall.

4. The system of claim 1, wherein the hybrid controller comprises a backend server of a trusted environment of the multi-tenant environment including the dedicated domain and the cloud domain.

5. The system of claim 4, further comprising a cloud server application programming interface (API) to provision a second cloud server of the cloud domain and associate the second cloud server with the client.

6. The system of claim 5, wherein the hybrid controller is to automatically determine presence of the second cloud server and to update an access control table of the network device to allow traffic from the second cloud server destined to the at least one dedicated server of the dedicated environment to be routed through the private network and the network device to the at least one dedicated server.

7. The system of claim 1, wherein the hybrid controller is to create a record for the at least one cloud server, the record including an identifier of the at least one cloud server and an IP address of the at least one cloud server.

8. The system of claim 1, wherein the hybrid controller is to:
poll the cloud domain for added or removed cloud servers at a predetermined interval; and
automatically update at least one record based on the polling.

9. The system of claim 1, wherein the system is to route a communication destined from the at least one cloud server to a computing device coupled to the public network through the private interface, the private network, the physical interconnect, the network device, and thereafter to the computing device via the public network.

10. A system comprising:
a cloud server associated with a first customer, the cloud server of a cloud environment of a multi-tenant data center;
a network device of the first customer coupled to the cloud server via a private interface of the cloud server coupled to a physical interconnect coupled to a private network of the cloud environment, the network device a default gateway for outbound traffic from the cloud server; and
a trusted environment including a hybrid controller to manage interconnection between the cloud server and the network device according to a hybrid connected network in which the cloud server is coupled to the network device via the physical interconnect, wherein configuration information of the private interface of the cloud server is to be updated to maintain a pre-hybrid connection IP address and subnet mask of the cloud server and replace a pre-hybrid connection default gateway of the private interface with an IP address of the network device, to route all traffic to or from the cloud server via the network device, and disable a public interface of the cloud server, and wherein the network device is of a dedicated environment of the multi-tenant data center corresponding to a managed host environment of the multi-tenant data center, the dedicated environment including the network device and at least one dedicated server associated with the first customer, wherein the hybrid controller is to store a record for the cloud server, the record including a metadata key and a metadata value, and the network device is to store an entry associated with the cloud server and including the metadata key and the metadata value, wherein based at least in part on the entry the network device is to permit outbound traffic from the cloud server directed to the at least one dedicated server to be routed directly to the at least one dedicated server without traversing a public network of the multi-tenant data center, the network device configured to otherwise prevent communications from the cloud environment from being passed to dedicated servers of the dedicated environment.

11. The system of claim 10, wherein the system is to disable the public interface of the cloud server to prevent the outbound traffic from being routed directly to the public network.

12. The system of claim 10, wherein the system is to access the entry to determine whether to allow communications from the cloud server destined for the at least one dedicated server to be routed directly from the network device to the at least one dedicated server.

13. The system of claim 12, wherein the system is to access the entry responsive to receipt of a communication from the cloud server and to route the communication to a destination device according to the entry.

14. The system of claim 10, wherein the system is to request a cloud server application programming interface (API) to poll the cloud environment at a periodic interval.

15. The system of claim 14, wherein the system is to receive a result of the polling of the cloud environment and determine whether at least one record of the hybrid controller is to be updated based on the result of the polling.

16. The system of claim 10, wherein the system is to automatically determine presence of the cloud server within a predetermined time after instantiation of the cloud server and to update the configuration information responsive to the determination.

* * * * *